United States Patent
Hansing et al.

(10) Patent No.: US 10,762,022 B2
(45) Date of Patent: Sep. 1, 2020

(54) BUS ARRANGEMENT AND METHOD FOR OPERATING A BUS ARRANGEMENT

(71) Applicant: EATON INTELLIGENT POWER LIMITED, Dublin (IE)

(72) Inventors: Matthias Hansing, Bad Honnef (DE); Franz Heller, Sankt Augustin (DE); Peter Thiessmeier, Wachtberg (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 68 days.

(21) Appl. No.: 15/781,526

(22) PCT Filed: Dec. 6, 2016

(86) PCT No.: PCT/EP2016/079829
§ 371 (c)(1),
(2) Date: Jun. 5, 2018

(87) PCT Pub. No.: WO2017/097734
PCT Pub. Date: Jun. 15, 2017

(65) Prior Publication Data
US 2018/0276169 A1    Sep. 27, 2018

(30) Foreign Application Priority Data
Dec. 7, 2015    (DE) .................. 10 2015 121 291

(51) Int. Cl.
*G06F 13/40*    (2006.01)
*H04L 12/40*    (2006.01)

(52) U.S. Cl.
CPC .... *G06F 13/4068* (2013.01); *H04L 12/40078* (2013.01)

(58) Field of Classification Search
CPC .................................................. G06F 17/5009
See application file for complete search history.

(56) References Cited

U.S. PATENT DOCUMENTS 7,124,102 B2 * 10/2006 Aune ................. G06Q 20/3674
                                                                  705/35
8,509,927 B2    8/2013 Schmidt
(Continued)

FOREIGN PATENT DOCUMENTS

DE         19740306 A1    3/1999
DE    102009042368 A1    3/2011
(Continued)

OTHER PUBLICATIONS

IEC 61784-3-3, International Standard, Industrial communication network—Profiles—Part 3-3: Functional safety fieldbuses—Additional specifications for CPF 3, Edition 1.0 Dec. 2007.

*Primary Examiner* — Henry Tsai
*Assistant Examiner* — Juanito Borromeo
(74) *Attorney, Agent, or Firm* — Leydig, Voit & Mayer, Ltd.

(57) ABSTRACT

A bus arrangement includes a coordinator having a coordinator address; a first subscriber having a first subscriber address; and a bus, which couples the coordinator to the first subscriber. The first subscriber is configured to receive an information message from the coordinator in a configuration phase, to extract the coordinator address from the information message, and to establish and store a safety address as a function of the first subscriber address and the coordinator address.

9 Claims, 2 Drawing Sheets

(56) References Cited

U.S. PATENT DOCUMENTS

| | | | |
|---|---|---|---|
| 9,632,962 B2 | 4/2017 | Nagase | |
| 9,736,020 B2 | 8/2017 | Cho | |
| 2009/0235124 A1* | 9/2009 | Schmidt | G05B 19/0423 |
| | | | 714/48 |
| 2010/0146182 A1* | 6/2010 | Gutekunst | H04L 12/40032 |
| | | | 710/305 |
| 2017/0120438 A1 | 5/2017 | Kynast | |

FOREIGN PATENT DOCUMENTS

| | | |
|---|---|---|
| DE | 102014206289 A1 | 10/2015 |
| DE | 102014207389 A1 | 10/2015 |
| EP | 2782294 A1 | 9/2014 |
| EP | 2804063 A2 | 11/2014 |

* cited by examiner

BUS ARRANGEMENT AND METHOD FOR OPERATING A BUS ARRANGEMENT

CROSS-REFERENCE TO PRIOR APPLICATIONS

This application is a U.S. National Stage Application under 35 U.S.C. § 371 of International Application No. PCT/EP2016/079829 filed on Dec. 6, 2016, and claims benefit to German Patent Application No. DE 10 2015 121 291.9 filed on Dec. 7, 2015. The International Application was published in German on Jun. 15, 2017 as WO 2017/097734 A1 under PCT Article 21(2).

FIELD

The present invention relates to a bus arrangement and to a method for operating a bus arrangement.

BACKGROUND

A bus arrangement can be used in automation technology, for example. A bus arrangement typically has one coordinator and several subscribers. The subscribers can be embodied as actuators or sensors. The actuators can be switching devices, such as contactors, motor starters and circuit breakers, command devices and frequency converters. Safety-critical processes use a safety subscriber and a safety coordinator, frequently using a safety address. The address can be set manually, for example with dual in-line package switches, abbreviated to DIP switches.

SUMMARY

In an embodiment, the present invention provides a bus arrangement that includes a coordinator having a coordinator address; a first subscriber having a first subscriber address; and a bus, which couples the coordinator to the first subscriber. The first subscriber is configured to receive an information message from the coordinator in a configuration phase, to extract the coordinator address from the information message, and to establish and store a safety address as a function of the first subscriber address and the coordinator address.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
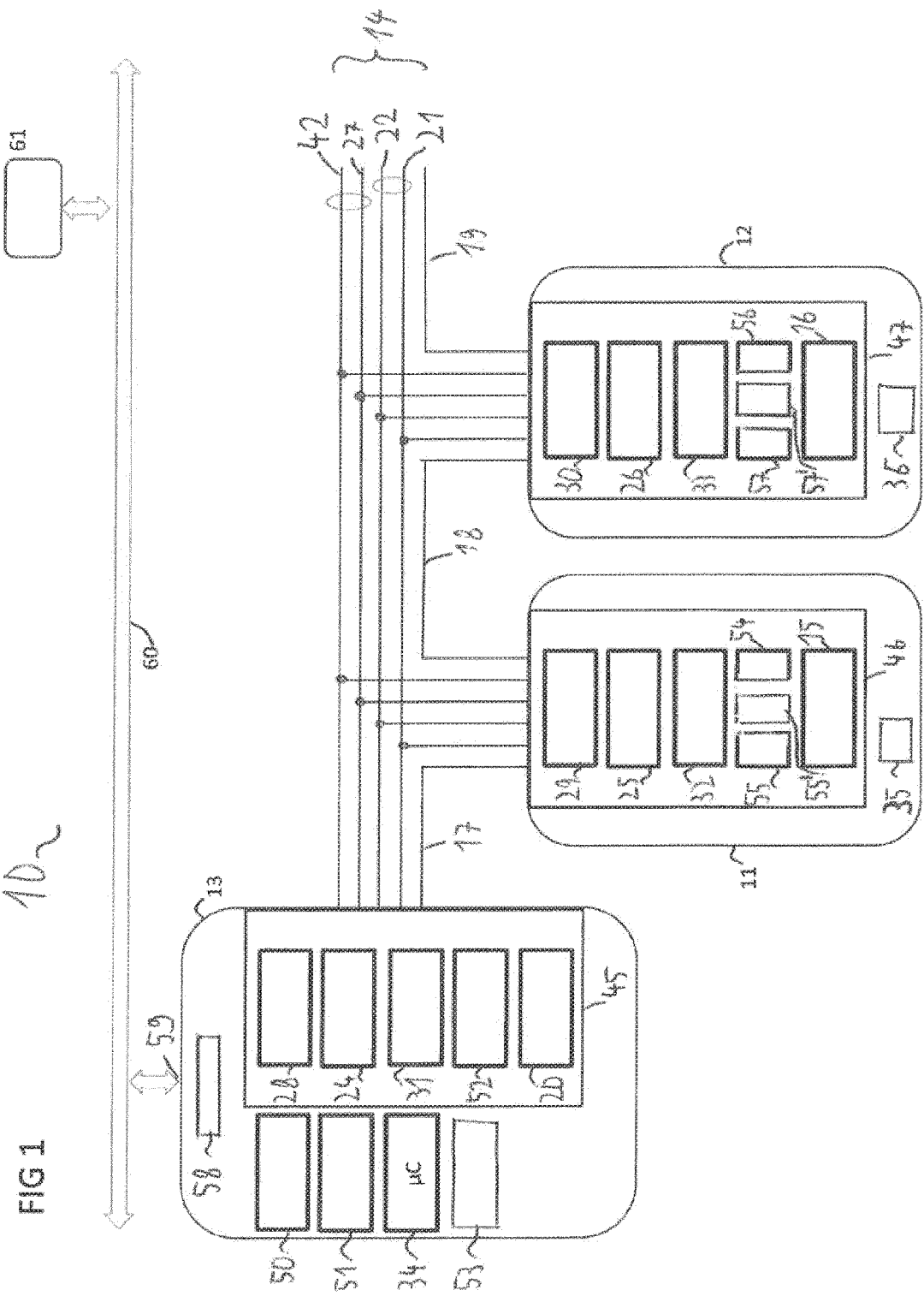
FIG. 1 illustrates an embodiment of a bus arrangement.

An embodiment of the invention provides a bus arrangement, including a coordinator having a coordinator address, a first subscriber having a first subscriber address, and a bus that couples the coordinator to the first subscriber. In a configuration phase (K), the first subscriber is configured (designed) to receive an information message from the coordinator, to retrieve the coordinator address from the information message and to establish and store a security address as a function of the first subscriber address and the coordinator address.

An embodiment of the present invention provides a bus arrangement having a subscriber with a safety address, and a method for operating a bus arrangement, in which the safety address is established without manual actuation of switches.

In one embodiment, a bus arrangement includes a coordinator, which has a coordinator address, a first subscriber having a first subscriber address, and a bus, which couples the coordinator to the first subscriber. The first subscriber is designed to receive an information message from the coordinator in a configuration phase, to extract the coordinator address from the information message, and to establish and store a safety address as a function of the first subscriber address and the coordinator address.

Advantageously, the first subscriber establishes the safety address without the use of DIP switches or other hardware setting options that must be manually operated.

In one embodiment, the first subscriber is a safety subscriber.

In one embodiment, the coordinator is implemented as a safety coordinator. The coordinator address may be a fieldbus address of the coordinator.

In one embodiment, the safety address is established from the address of the source and the address of the destination of a safe connection. The safe connection is realized as a point-to-point connection. The first subscriber and the coordinator are the destination and the source, and thus the end points of the point-to-point connection.

In one embodiment, the first subscriber determines the safety address by the first subscriber multiplying the coordinator address by a prespecified value M and adding the first subscriber address to the product, or by the first subscriber multiplying the first subscriber address by a prespecified value N and adding the coordinator address to the product.

In one embodiment, the prespecified value M is greater than the greatest value that the first subscriber address can assume. Accordingly, the prespecified value N is also greater than the greatest value that the coordinator address can assume. As such, the prespecified value M is outside the address range of the subscriber addresses. Furthermore, the prespecified value N is outside the address range of the coordinator addresses and therefore of the fieldbus subscriber addresses.

Advantageously, therefore, the safety address in the bus arrangement is unique. It is used for exactly one connection of a subscriber and a coordinator. No combination of the subscriber address of another subscriber and the coordinator address of the coordinator or of another coordinator yields the safety address of the first subscriber.

In one embodiment, the coordinator likewise establishes the safety address in the configuration phase as a function of the first subscriber address and the coordinator address, and stores the safety address. The function used by the coordinator is identical to the function used by the first subscriber.

Advantageously, the coordinator and the first subscriber can establish the identical safety address automatically and independently of each other.

In one embodiment, the coordinator address is stored in the coordinator in a non-volatile semi-permanent memory or in a volatile memory of the coordinator.

In one embodiment, the safety address is stored in the coordinator in the non-volatile semi-permanent memory or the volatile memory of the coordinator. If the safety address is stored in the non-volatile semi-permanent memory, it is retained in the coordinator.

In one embodiment, the safety address is stored in the first subscriber in a first volatile memory or a first non-volatile semi-permanent memory of the first subscriber. The safety address is retained in the first non-volatile semi-permanent memory of the first subscriber.

In one embodiment, the prespecified value M and/or the prespecified value N is stored in the first nonvolatile semi-permanent memory or in a first nonvolatile permanent memory of the first subscriber, and in the non-volatile semi-permanent memory or in a non-volatile permanent memory of the coordinator.

In one embodiment, a first serial number is stored in the first nonvolatile permanent memory of the first subscriber. The coordinator connects to the first subscriber in the configuration phase, queries the first serial number, and stores it in the non-volatile semi-permanent memory of the coordinator.

In one embodiment, the coordinator also transmits the first serial number in the information message. The first subscriber compares the first serial number transmitted in the information message with the first serial number stored in the first non-volatile permanent memory. Only after verifying a match does the first subscriber establish the safety address.

In one embodiment, the bus arrangement includes a second subscriber.

In one embodiment, the second subscriber has a second serial number. The bus couples the coordinator to the first and the second subscriber. The coordinator establishes a connection to the second subscriber in the configuration phase, queries the second serial number, and stores it in the non-volatile semi-permanent memory. As such, the non-volatile semi-permanent memory of the coordinator continues to store the first and the second serial numbers, even if the coordinator power supply is interrupted.

In one development, the coordinator compares the first serial number stored in the non-volatile semi-permanent memory with the second serial number stored in the non-volatile semi-permanent memory. The coordinator provides a signal according to the result of the comparison. The signal thus represents the information regarding whether the two serial numbers are identical. If the serial numbers are identical, an error has occurred.

Furthermore, the second subscriber has a second non-volatile permanent memory in which the second serial number is stored. Advantageously, the first and the second subscriber have unique serial numbers. Since the first subscriber differs from the second subscriber on the basis of the respective serial numbers, it is possible to address the subscriber via the serial number. The first serial number is a globally unique number that is stored in the first subscriber during the manufacture of the first subscriber. Accordingly, the second serial number is also a unique number which is stored in the second subscriber during the manufacture of the second subscriber.

The first and the second non-volatile permanent memory of the subscribers and the nonvolatile permanent memory of the coordinator may be, for example, memories such as a read-only memory, abbreviated as ROM, a programmable read-only memory, abbreviated as PROM, or a one-time programmable module, abbreviated as OTP module.

The first and second nonvolatile semi-permanent memories of the subscribers and the nonvolatile semi-permanent memory of the coordinator may be, for example, memories such as an electrically erasable programmable read-only memory, abbreviated as EEPROM, or a flash EEPROM. The first and second non-volatile semi-permanent memories of the subscribers and the non-volatile semi-permanent memory of the coordinator do not lose their memory content in a power-off phase.

The first and second volatile memories of the subscribers and the volatile memory of the coordinator may be implemented, for example, as random-access memory, abbreviated RAM, or as flash memory. The RAM may be implemented as dynamic random-access memory, abbreviated as DRAM, or static random-access Memory, abbreviated as SRAM. The first and second volatile memories and the volatile memory of the coordinator lose their memory content in the power-off phase.

In one embodiment, the bus includes a first signal line which couples the first subscriber and the coordinator, and at least one bus line which connects the coordinator to the first subscriber. In the configuration phase, the coordinator activates the first subscriber via the first signal line and sends a message containing the first subscriber address via the at least one bus line.

In one embodiment, the first subscriber stores the first subscriber address in the first volatile memory of the first subscriber. Due to the fact that exactly one subscriber is activated, specifically the first subscriber, only this subscriber stores the subscriber address provided via the at least one bus line. A message of this type sent to all subscribers via the bus line can also be referred to as a broadcast message. Since, in the operating phase, the first subscriber continues to store, in the first volatile memory, the first subscriber address which was introduced in the configuration phase, it can be addressed by means of the first subscriber address. The first subscriber can be activated directly by the coordinator—or, if further subscribers are arranged between the coordinator and the first subscriber, via the subscriber preceding the first subscriber.

In one embodiment, the first subscriber is arranged between the coordinator and the second subscriber on the bus. The second subscriber may be connected on the bus after the first subscriber.

In one embodiment, the bus includes a second signal line connecting the second subscriber to the first subscriber. The at least one bus line connects the coordinator to the first and the second subscribers. The first subscriber activates the second subscriber in the configuration phase via the second signal line. The coordinator sends a message containing the second subscriber address via the at least one bus line to the first and the second subscribers.

In one embodiment, the second subscriber stores the second subscriber address in a second volatile memory of the second subscriber. Since, in the period in which the message with the second subscriber address is sent, only the second subscriber is activated, only the second subscriber transfers the second subscriber address to its volatile memory.

In one embodiment, the coordinator and the subscribers establish a series connection or chain which may be referred to as a daisy chain. Thus, the coordinator and the subscribers establish a daisy-chain arrangement or a daisy-chain bus. The coordinator and the subscribers are connected in series via the signal lines. The first subscriber can be directly connected to the coordinator. The other subscribers are each connected to their predecessors.

In one embodiment, the configuration phase is part of an operating phase. The operating phase is followed by a power-off phase, and then a further operating phase which begins with a restart phase. As the process continues, further operating phases which each have a restart phase at the beginning can alternate with power-off phases. As such, the restart phase follows the configuration phase.

In one embodiment, in a restart phase following the configuration phase, the coordinator establishes a connection to the first subscriber, queries the first serial number, and compares the queried first serial number with the first serial number stored in the non-volatile semi-permanent memory. The coordinator provides a signal if the two serial numbers differ. Advantageously, the coordinator can thus determine whether the first subscriber has been replaced, for example in the power-off phase before the restart phase. With this signal, the coordinator can thus inform the operator of the bus arrangement or a superordinate controller of the bus arrangement that the first subscriber has been replaced. If the first serial numbers are different, this can mean an error has occurred.

In one embodiment, the first signal line connects the first subscriber to the coordinator. The first subscriber and the coordinator are thus directly and permanently connected to each other via the first signal line.

In one embodiment, the second subscriber is directly and permanently connected to the first subscriber via the second signal line. The second subscriber is not directly connected to the first signal line. The second subscriber is coupled to the first signal line exclusively via the first subscriber. Accordingly, the coordinator is not directly connected to the second signal line. The coordinator is coupled to the second signal line via the first subscriber.

Both the coordinator and the first subscriber, and also the second subscriber, are directly connected to the at least one bus line.

In one embodiment, the at least one bus line of the bus is realized as exactly one bus line.

In an alternative embodiment, the bus has the at least one bus line, and also a further bus line. Thus, the bus has exactly two bus lines, specifically a first and a second bus line. The first and the second bus lines can be operated according to the TIA/EIA-485 A interface standard, also called EIA-485 or RS-485.

In one embodiment, the bus arrangement includes one or more further subscribers which are connected to the at least one bus line. Another subscriber can be connected to the second subscriber via a third signal line. However, the other subscriber(s) may also be arranged, for example, between the coordinator and the first subscriber.

In one embodiment, the first subscriber and, if present, the second subscriber is/are implemented as a configurable and/or parameterizable functional unit. A functional unit includes a physical component and a program module which controls the component or stores data of the component.

In one embodiment, at least one of the subscribers is realized as an actuator, measuring device or sensor. The actuator can be a switching device—such as a contactor, a motor starter or a power switch—a control device, a command device, a signaling device, an operating unit, or a frequency converter.

In one embodiment, in an operating phase, for example after the configuration phase or after the restart phase, the coordinator transmits, via the at least one bus line, a message which optionally contains the first subscriber address or the first serial number, and also data, to all subscribers and thus also to the first and second subscribers. The first subscriber recognizes the first subscriber address and the first serial number, such that the first subscriber processes the data in the message. The first subscriber can thus be addressed by a message containing only the first subscriber address and data, as well as by a message containing only the first serial number and data. The first subscriber can thus be addressed in two ways via the at least one bus line. In addition, the first subscriber can also be activated via the first signal line. The second and further subscribers can also recognize the second subscriber address and the second serial number and/or the further subscriber addresses and the further serial numbers, such that the second and/or further subscriber processes the data in the information message.

In one embodiment, a method for operating a bus arrangement includes the following steps: In a configuration phase, the coordinator sends an information message to the first subscriber. The first subscriber receives the information message and extracts a coordinator address of the coordinator from the information message. Further along in the configuration phase, the first subscriber establishes a safety address as a function of a first subscriber address of the first subscriber and the coordinator address, and stores the safety address. A bus couples the coordinator to the first subscriber.

The first subscriber advantageously establishes the safety address very efficiently, and automatically.

The bus arrangement and/or the method carries/carry out an automatic generation of a system-wide, unique communication identity or communication identity address. The communication identity or communication identity address may also be referred to as a safety address. As such, a unique communication identity is assigned within a safety system for bus subscribers, with functional safety.

The automatic generation of a unique endpoint identity is based on a bus address and a unique hardware serial number. This is done without the need for an additional addressing tool, such as an address switch or a parameterization tool. In order to prevent an addressing error, hardware serial numbers are additionally checked in the gateway—that is, in the coordinator—and additionally in the subscribers.

Safety subscribers use a unique safety address—which is also called a safe endpoint address or safety endpoint address—in the safe subscribers to detect address errors. This must both be unique throughout the system and match the value configured in the parameter set of the connection so that the safety mode can be started.

The unique safety addresses are established in the subscribers as follows: The initial value after power-up, for example the hexadecimal number 0xFFFF (corresponding to the decimal number 65535), of the safety address is invalid. After a Read_Configuration.rsp (response) has been sent, and the value of the coordinator identity is fixed by means of valid receipt of the Information_Report.ind (indication) with index=100, the safety address is established. The coordinator identity corresponds to the coordinator address.

Upon receiving the information report, the safety subscriber checks the received hardware serial number for a match with its own serial number, so that the assignment of the safety address is also unique. If the serial numbers are identical, it multiplies the received coordinator address by the value of, for example, 100 and adds its own subscriber address (e.g. from 1-99). With this result, it can then establish its safety address. The value range for the safety addresses is thus from 1 to 12599 (1<coordinator address<126, 201-12599).

The coordinator address and therefore a component of the safety address generation are transmitted independently of the parameter information message (Write_Configuration.req (request)). The subscriber's own subscriber address is also unique in this context. Accordingly, there is a simple rule for assigning the safety address in the engineering system (coordinator address·100+slot number). The slot number corresponds to the subscriber address.

In order to rule out an addressing error, the gateway—that is, the coordinator—and the safety subscriber check the hardware serial number. After a new configuration (Set New), the coordinator checks whether all hardware serial numbers in the target configuration are different. A double assignment of hardware serial numbers and/or a multiple addressing of a subscriber can be recognized in this way. Before calculating its safety address, the safety subscriber checks whether the hardware serial number sent by the gateway with the information report matches its serial number as well.

The bus arrangement allows combined addressing of subscribers. The bus arrangement can also be referred to as a bus system. An exchange of bus segments in operation is possible due to the combined addressing. The bus arrangement has a restart procedure. The restart procedure is possible without re-addressing. The bus arrangement can perform an addressing procedure via a daisy-chain and via the unique serial number, such that a further addressing of the subscribers is possible upon a restart even without a daisy chain.

Each time the bus arrangement is first powered up, a daisy-chain method is used. All subscribers on the bus are addressed by the coordinator with an ascending address sequence. In this method, a unique serial number is queried by each bus subscriber, and is stored in an integrated circuit which, inter alia, performs the bus communication. In this case, a globally unique number is stored in the integrated circuit during the manufacturing process. The integrated circuit can be implemented as an application-specific integrated circuit, abbreviated as ASIC. The integrated circuit may include a transceiver and the nonvolatile permanent memory of the subscriber for storing its serial number. In addition, a device identity (vendor, device) which indicates the type of device (e.g. Eaton, switch, 200 amp, type number) is read out. The addressing method ends at the first missing subscriber and/or at the last possible subscriber to be addressed. The unique serial number belonging to each addressed subscriber is retained at the coordinator together with its subscriber address. Using this method, bus segments can be switched off and switched on again. The daisy chain stands for the geographical position in this case.

For example, upon a restart of the coordinator, the bus subscribers are addressed without a daisy chain. The corresponding unique hardware serial number which was determined during initial configuration can then be verified with the remanents via the daisy chain. This prevents misaddressing. All serial numbers in the bus arrangement are checked to avoid duplicate addressing.

If one or more subscribers are not recognized, for example, due to an interruption of the daisy chain (e.g. in the event of a missing or faulty subscriber), the addressing can be continued with the unique hardware serial number even without a daisy chain. This means that each subscriber in the system has a unique serial number (this serial number is given to each ASIC during production), and if the signal line (daisy chain) goes down, it can then be addressed precisely via this serial number. This is done in a message which is transmitted via the bus system. Only this subscriber can use this information for itself, and then respond to it. Everything else is then controlled by the coordinator. This method is also used as an option in operation, in the event of an outage of bus segments and the reconnection of subscribers.

The invention will be explained in more detail below with reference to a plurality of embodiments and to the drawings.

Components or functional units with the same functionality and/or effects are denoted by the same reference signs. Where components or functional units correspond in function, their description will not be repeated.

FIG. 1 shows an exemplary embodiment of a bus arrangement 10, including a first and a second subscriber 11, 12, a coordinator 13, and a bus 14. The coordinator 13 is connected to the first and the second subscribers 11, 12 via the bus 14. The first and the second subscribers 11, 12 each have a processor core 15, 16. The bus 14 includes a first signal line 17 which connects a connection of the coordinator 13 to a connection of the first subscriber 11 and therefore, for example, to a connection of the processor core 15 of the first subscriber 11. The first signal line 17 is not directly connected to the second or to a further subscriber 12. For reasons of clarity, the lines in the coordinator 13 and in the first and second subscribers 11, 12 are not shown.

Furthermore, the bus 14 includes a second signal line 18 which connects a connection of the first subscriber 11 to a connection of the second subscriber 12. For example, the second signal line 18 connects the processor core 15 of the first subscriber 11 to the processor core 16 of the second subscriber 12. In addition, the bus 14 can include a third signal line 19 which connects a connection of the second subscriber 12 to a third subscriber. The coordinator 13 includes a processor core 20 which is connected to the first signal line 17. The bus 14 is realized as a linear bus. The bus 14 can be designed as a serial bus. The coordinator 13 can be implemented as master. The subscribers 11, 12 can be realized as slaves or devices. The processor core 15, 16, 20 can be implemented as a microprocessor.

The processor core 20 of the coordinator 13 is connected to the first signal line 17 via a signal line circuit 31 of the coordinator 13. Furthermore, the processor core 15 of the first subscriber 11 is connected to the first and the second signal line 17, 18 via a signal line circuit 32 of the first subscriber 11. The processor core 16 of the second subscriber 12 is connected via a signal line circuit 33 of the second subscriber 12 to the second and, if present, also to the third signal line 18, 19.

In addition, the bus 14 includes at least one bus line 21 which connects the coordinator 13 to all of the subscribers, and thus to the first and the second subscribers 11, 12. A signal on the at least one bus line 21 reaches all subscribers 11, 12. The bus 14 can include a further bus line 22 which connects the coordinator 13 to all of the subscribers 11, 12. The at least one bus line 21 and the further bus line 22 can also be referred to as the first and second bus lines. The coordinator 13 includes a transceiver 24 which couples the processor core 20 to the first and the second bus lines 21, 22. The first and second subscribers 11, 12 also each include a transceiver 25, 26 with connections which are connected to the first and the second bus lines 21, 22. In the first and the second subscribers 11, 12, the transceiver 25, 26 is coupled to the processor cores 15, 16, respectively. The first and the second bus lines 21, 22, and the transceivers 24-26 of the coordinator 13 and of the subscribers 11, 12, can be implemented in accordance with the RS-485 interface standard. The transceivers 24-26 of the coordinator 13 and the subscribers 11, 12 can be designed as transmit transceivers and receive transceivers and implemented for half-duplex operation.

In addition, the bus 14 includes a supply line 27 which connects a power supply 28 of the coordinator 13 to a power supply 29 of the first subscriber 11 and a power supply 30 of the second subscriber 12. Each of the power supplies 28, 29, 30 can be realized as a voltage regulator.

Furthermore, the first and the second subscriber 11, 12 can each have an application device 35, 36. The application device 35, 36 can be implemented as an actuator device, measuring device or sensor device. As such, the first and the second subscribers 11, 12 can be realized as an actuator, measuring device and/or sensor. The application device 35 of the first subscriber 11 is coupled to the processor core 15 of the first subscriber 11. The same is true for the second subscriber 12. Furthermore, the bus 14 includes a reference potential line 42 which connects a reference potential connection of the coordinator 13 to reference potential connections of the first and the second subscribers 11, 12. The supply line 27 and the reference potential line 42 supply power to the subscribers 11, 12 by means of the coordinator 13.

In addition, the coordinator 13 includes a memory 53 which is connected to the processor core 20 or to a microcontroller 34 of the coordinator 13. The memory 53 can be realized as a nonvolatile semi-permanent memory. Furthermore, the coordinator 13 includes a volatile memory 52. The first subscriber 11 can include a first volatile memory 54, a first nonvolatile permanent memory 55, and a first nonvolatile semi-permanent memory 55', which can be connected to the transceiver 25. The second subscriber 12 can include a second volatile memory 56, a second non-volatile permanent memory 57 and a second non-volatile semi-permanent memory 57', which can be connected to the transceiver 26.

The coordinator 13 includes an integrated circuit 45 which can be implemented as an ASIC. The integrated circuit 45 can include the power supply 28, the transceiver 24, the signal line circuit 31, the volatile memory 52, and the processor core 20. Furthermore, the first and the second subscriber 11, 12 each include an integrated circuit 46, 47, which can be realized as an ASIC. The integrated circuit 46 of the first subscriber 11 can include the power supply 29, the transceiver 25, the signal line circuit 32, the first volatile memory 54, the first non-volatile permanent memory 55, and the processor core 15. Accordingly, the integrated circuit 47 of the second subscriber 12 can include the power supply 30, the transceiver 26, the signal line circuit 33, the second volatile memory 56, the second non-volatile permanent memory 57, and the processor core 16.

The coordinator 13 includes a further transceiver 58 which couples a further bus connection 59 of the coordinator 13 to the microcontroller 34. Furthermore, the bus arrangement 10 includes a fieldbus 60 which is connected to the further bus connection 59. The bus arrangement 10 has a controller 61 which is connected to the fieldbus 60. The coordinator 13 can be an exchange point such as a gateway, router or switch. The coordinator 13 has an oscillator 50. The oscillator 50 can be designed as an RC oscillator. The oscillator 50 can be used for timing. The coordinator 13 can include a non-volatile permanent memory 51 or a further volatile memory.

The bus 14 is realized as a ribbon cable or round cable. According to FIG. 1, the bus 14 can consist of five wires, for example. Alternatively, the bus 14 can have a different number of wires, for example eight wires.

The functionality of the bus arrangement 10 according to FIG. 1 will be explained with reference to FIG. 2.

In an alternative embodiment, a gateway couples the fieldbus 60 to the bus 14. The controller 61 is implemented as a coordinator. A safe connection is realized between the coordinator 61 and the first subscriber 11, and leads from the coordinator 61 via the fieldbus 60, the gateway and the bus 14 to the first subscriber 11. The coordinator 61 can be implemented as a programmable logic controller. The safety address is established from the subscriber address of the first subscriber 11 and the coordinator address, which is a fieldbus address of the coordinator 61 on the fieldbus 60.

Figure 2:
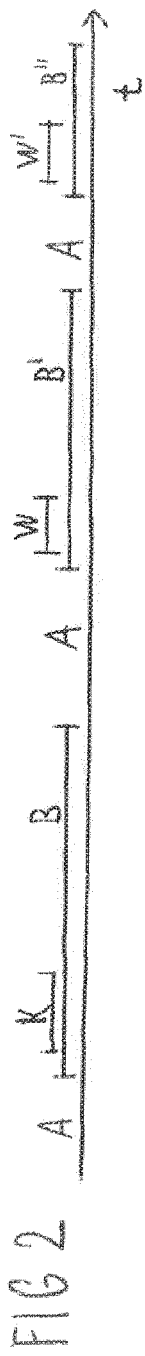
FIG. 2 illustrates an exemplary time sequence of phases in a bus arrangement.

FIG. 2 shows an exemplary embodiment of the chronological profile of the phases, which are plotted against time t. The configuration phase K is carried out at the beginning of an operating phase B. After the coordination phase K is carried out, a regular operation of the bus assembly 10, for example, occurs in the operating phase B. A power-off phase A occurs after the operating phase B. In the power-off phase A, the coordinator 13 and the subscribers 11, 12 are not supplied with electrical energy. The power-off phase A is followed by a further operating phase B'. At the beginning of the further operating phase B', a restart phase W is carried out. After the restart phase W, the regular operation of the bus arrangement 10 occurs in the further operating phase B'. Further power-off phases A and further operating phases B'' can follow the further operating phase B'. In the power-off phases A, the subscribers 11, 12 do not store any subscriber addresses. In the restart phase W, the coordinator 13 carries out the same steps as in the configuration phase K to assign the subscriber addresses to the subscribers 11, 12.

In the configuration phase K, as well as in the restart phase W, the subscribers 11, 12 are successively addressed via the coordinator 13 and with the aid of the daisy chain starting with the subscriber closest to the coordinator 13, and the geographical positions and thus the order of the subscribers 11, 12 are fixed. In the example shown in FIG. 1, the coordinator 13 activates the first subscriber 11 via the first signal line 17. After the activation, the coordinator 13 sends a bus message via the first and the second bus lines 21, 22 which contains a first subscriber address, such as 1, to all of the subscribers 11, 12. Only the activated subscriber, namely the first subscriber 11, takes the first subscriber address contained in the bus message into its first volatile memory 54. The bus messages are realized as broadcasts. From this point in time, the first subscriber 11 can receive bus messages with the previously received subscriber address.

The first non-volatile permanent memory 55 of the first subscriber 11 stores a first serial number. The serial number is permanently stored. In the configuration phase K, the coordinator establishes a connection to the first subscriber 11, queries the first serial number, and stores it in the non-volatile semi-permanent memory 53 of the coordinator 13.

The coordinator 13 has stored a coordinator address in its non-volatile semi-permanent memory 53 or in its non-volatile permanent memory 51. In the configuration phase K, the coordinator 13 sends the first subscriber 11 an information message which includes the first serial number and the coordinator address. The first subscriber 11 stores the coordinator address in the first volatile memory 54 or in the first non-volatile semi-permanent memory 55'. The first subscriber 11 compares the first serial number transmitted in the information message with the first serial number stored in the first non-volatile permanent memory 55. After verifying the match, the first subscriber 11 establishes the safety address. If there is no match, the first subscriber 11 does not generate a safety address. The first subscriber 11 generates the safety address using the equation:

$$\text{safety address} = \text{coordinator address} \cdot M + \text{first subscriber address},$$

where M is a prespecified value. The prespecified value M can be stored in the first non-volatile semi-permanent memory 55'. The first subscriber 11 stores the safety address in the first volatile or first non-volatile semi-permanent memory 54, 55'.

The coordinator 13 likewise calculates the safety address independently of the first subscriber 11 according to the above equation, and stores it in the non-volatile semi-permanent memory 53 or in the volatile memory 52.

In a further step of the configuration phase K, the coordinator 13 sends a bus message to all of the subscribers which contains the first subscriber address and the command to activate the output signal line that is, the second signal line 18. The first subscriber 11 detects, by means of its transceiver 25, that it is being addressed, and activates the second subscriber 12 via a signal on the second signal line 18. Subsequently, the coordinator 13 sends a bus message to all of the subscribers 11, 12 which contains the second subscriber address, for example 2. However, since only the second subscriber 12 is activated, only the second subscriber 12 takes the second subscriber address into its volatile memory 56. The addressing is carried out by the coordinator 13 until all of the subscribers have been assigned a subscriber address. After completion of the configuration phase K, the coordinator 13 is configured in such a manner that it can address all of the subscribers 11, 12 via the subscriber addresses.

In the configuration phase, the coordinator 13 connects to the second subscriber 12, queries the second serial number, and stores the number in the non-volatile semi-permanent memory 53. The coordinator 13 compares the first serial number stored in the non-volatile semi-permanent memory 53 with the second serial number stored in the non-volatile semi-permanent memory 53, and outputs a signal if the two serial numbers are identical. This signal indicates an error.

In a power-off phase A, for example, a subscriber can be inserted between the coordinator 13 and the first subscriber 11, or removed. The first subscriber 11 can thus receive a different subscriber address in the restart phase W than in the configuration phase K. In one embodiment, the first subscriber 11 and the coordinator 13, recreate the safety address and store it in the restart phase W. The safety address can thus be different in the different operating phases B, B', B".

An operator can also reset the bus arrangement 10, for example, by means of a switch of the coordinator 13, such that the bus arrangement 10 starts again with an operating phase B which has a configuration phase K. In the configuration phase K, the safety address is recalculated and stored again.

The coordinator 13 is directly connected to the first subscriber 11 via the first signal line 17. The first subscriber 11 is directly connected to the second subscriber 12 via the second signal line 18. Accordingly, the second subscriber 12 can be directly connected to a third subscriber via the third signal line 19. The first to third signal lines 17, 18, 19 form a daisy chain. In addition, the coordinator 13 is directly connected to all of the subscribers 11, 12 via the at least one bus line 21 and the further bus line 22, which are also referred to as the first and second bus lines.

The addressed subscribers 11, 12, including parameter data and configuration data (serial numbers, manufacturer identity), are retained in the non-volatile semi-permanent memory 53 of the coordinator 13. By means of the unique serial number, previously determined subscribers 11, 12 can be addressed by the coordinator 13 again, even after failures. The addressed subscribers 11, 12 do not retain their subscriber addresses, and behave as at the outset after a renewed power-up.

In an alternative embodiment, the first subscriber 11 generates the safety address using the equation:

$$\text{safety address} = \text{first subscriber address} \cdot N + \text{coordinator address},$$

where N is a prespecified value and can be stored in the non-volatile semi-permanent memory 55' of the first subscriber 11.

In an alternative embodiment, the first subscriber 11 generates the safety address by combining the first subscriber address and the coordinator address. In this case, the digits of the coordinator address can prefix the digits of the subscriber address. Alternatively, the digits of the subscriber address can prefix the digits of the coordinator address.

Figure 3:
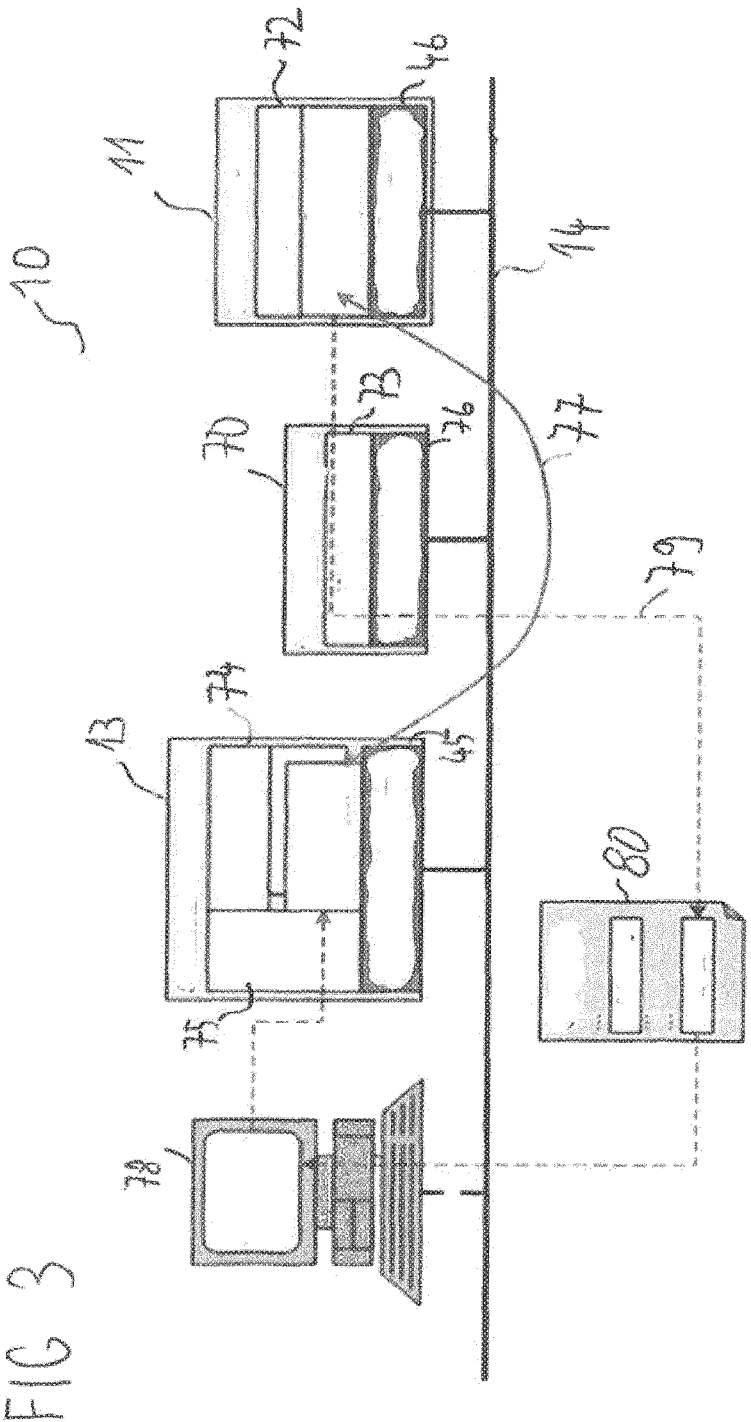
FIG. 3 illustrates an embodiment of a bus arrangement.

FIG. 3 shows a further exemplary embodiment of a bus arrangement 10, which is a development of the bus arrangement explained in FIGS. 1 and 2. The bus arrangement 10 includes the bus 14, the coordinator 13 and the first subscriber 11. The bus arrangement also includes a further subscriber 70 which is connected to the bus 14. The further subscriber 70 is arranged between the coordinator 13 and the first subscriber 11. The first subscriber 11 is implemented as a safety subscriber. The first subscriber 11 executes a safety application 72. The first subscriber 11 is used as a safety responder. The further subscriber 70, however, is implemented as a non-safety subscriber. The further subscriber 11 executes a non-safety application 73.

The coordinator 13 is designed as a safety coordinator. The coordinator 13 can be a safety programmable logic controller, abbreviated safety PLC or safety control relay. The coordinator 13 executes a safety application 74 and a non-safety application 75. The coordinator 13 is used as a safety initiator. The coordinator and the first and the further subscribers 11, 70 are coupled via the integrated circuit 45, 46, 76.

There is a safe connection 77 between the coordinator 13 and the first subscriber 11.

In addition, the bus assembly 10 can include a computer 78. The computer 78 can be temporarily or permanently connected to the bus 14. The computer 78 sets up the safety application 74 of the coordinator 13 and the safety application 72 of the first subscriber 11. The computer 78 thus has an engineering relationship 79 to the safety applications 72, 74 of the first subscriber 11 and the coordinator 13. For this purpose, the computer 78 uses the device master data files 80, abbreviated DMD files, of the first subscriber 11 and the coordinator 13.

The device master data files 80 include safety modules and non-safety modules.

FIG. 3 shows an architecture of a safe bus system 10. A safety PLC or safety control relay connected as a safety coordinator 13 controls the safe first subscriber 11 that is connected to the bus 14.

Safety subscribers and the use of a unique safety address—the safety endpoint address—refer to the safety layer by describing the critical points in more detail. In this case, it is the tunneling of a protocol on the bus 14 or the bus arrangement 10. The configuration and parameterization of the safety connected references—abbreviated as S-CRs—take place via a safety reference engineering tool. For each S-CR, the S-CR parameters are protected by a cyclic redundancy check signature, abbreviated as CRC signature. The S-engineering tool calculates the signature and saves it in the parameter set of the S-CR. Each safety communication reference end point, abbreviated S-CREP, also calculates the signature after receiving the S-CR parameters and compares it with the signature contained in the received parameter set. Only if both match can the received parameter set be used.

The bus 14 transmits the so-called safety protocol data units—abbreviated as S-PDUs—in a part of the received and transmitted data sections of a safe subscriber. In this case, cyclic 1-to-1 communication relationships (S-CR) are formed between the safety communication reference end points. The generation/evaluation of the S-PDUs takes place in the safety communication reference endpoints of these relationships. An S-PDU is generated in each case only by a safety communication reference endpoint of the coordinator/a subscriber and evaluated only by the corresponding safety communication reference endpoint of a subscriber/the coordinator.

In an alternative embodiment, the coordinator 13 is coupled to the first subscriber 11 via a fieldbus, a gateway and the bus 14. The safe connection 77 is thus maintained across two buses and one gateway.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The following is a list of reference numbers:
10 bus arrangement
11 first subscriber
12 second subscriber
13 coordinator
14 bus
15, 16 processor core
17 first signal line
18 second signal line
19 third signal line
20 processor core
21 at least one bus line
22 further bus line
24, 25, 26 transceiver
27 supply line
28, 29, 30 power supply
31, 32, 33 signal line circuit
34 microcontroller
35, 36 application device
42 reference potential line
45, 46, 47 integrated circuit
50 oscillator
51 non-volatile permanent memory
52 volatile memory
53 non-volatile semi-permanent memory
54 first volatile memory
55 first non-volatile permanent memory
55' first non-volatile semi-permanent memory
56 second volatile memory
57 second non-volatile permanent memory
57' second non-volatile semi-permanent memory
58 further transceiver
59 further bus connection
60 fieldbus
61 controller
70 further subscriber
72 safety application
73 non-safety application
74 safety application
75 non-safety application
76 integrated circuit
77 safe connection
78 computer
79 engineering relationship
80 device master data file
A power-off phase
B, B', B" operating phase
K configuration phase
t time
W, W' restart phase

The invention claimed is:

1. A bus arrangement, comprising:
a coordinator having a coordinator address;
a first subscriber having a first subscriber address; and
a bus, which couples the coordinator to the first subscriber,
wherein the first subscriber is configured to receive an information message from the coordinator in a configuration phase, to extract the coordinator address from the information message, and to establish and store a safety address as a function of the first subscriber address and the coordinator address,
wherein the first subscriber is configured to determine the safety address in that:
the first subscriber multiplies the coordinator address by a prespecified value M to determine a first product, and adds the first subscriber address to the first product, or
the first subscriber multiplies the first subscriber address by a prespecified value N to determine a second product, and adds the coordinator address to the second product.

2. The bus arrangement according to claim 1, wherein the prespecified value M is greater than the greatest value that the first subscriber address can take, and/or the prespecified value N is greater than the greatest value that the coordinator address can take.

3. The bus arrangement according to claim 1,
wherein the coordinator is configured to establish and store the safety address in the configuration phase as a function of the first subscriber address and the coordinator address, and
wherein the function used by the coordinator is identical to the function used by the first subscriber.

4. The bus arrangement according to claim 1,
wherein the first subscriber comprises a first non-volatile permanent memory in which a first serial number is stored, and
wherein the coordinator is configured to connect to the first subscriber in the configuration phase, to query the first serial number, and to store the first serial number in a non-volatile semi-permanent memory of the coordinator.

5. The bus arrangement according to claim 4,
wherein the coordinator is configured to transmit the first serial number in the information message, and
wherein the first subscriber is configured to compare the first serial number transmitted in the information message with the first serial number stored in the first non-volatile permanent memory, and to establish the safety address after verifying the match.

6. A bus arrangement, comprising:
a coordinator having a coordinator address;
a first subscriber having a first subscriber address; and
a bus, which couples the coordinator to the first subscriber,
wherein the first subscriber is configured to receive an information message from the coordinator in a configuration phase, to extract the coordinator address from the information message, and to establish and store a safety address as a function of the first subscriber address and the coordinator address
wherein the first subscriber comprises a first non-volatile permanent memory in which a first serial number is stored, and
wherein the coordinator is configured to connect to the first subscriber in the configuration phase, to query the first serial number, and to store the first serial number in a non-volatile semi-permanent memory of the coordinator,
wherein the bus arrangement comprises a second subscriber with a second serial number,
wherein the bus couples the coordinator to the first subscriber and the second subscriber, and
wherein the coordinator is configured to connect to the second subscriber in the configuration phase, to query the second serial number, to store the second serial number in the non-volatile semi-permanent memory, to compare the first serial number stored in the non-volatile semi-permanent memory with the second serial number stored in the non-volatile semi-permanent memory, and to provide a signal if the first serial number is identical to the second serial number.

7. The bus arrangement according to claim 1,
wherein the bus comprises a first signal line, which couples the first subscriber and the coordinator, and at least one bus line, which connects the coordinator to the first subscriber,
wherein the coordinator is configured to activate the first subscriber in the configuration phase via the first signal line, and to transmit a message containing the first subscriber address via the at least one bus line, and
wherein the first subscriber is configured to store the first subscriber address in a first volatile memory of the first subscriber.

8. The bus arrangement according to claim 1,
wherein the bus comprises a second signal line, which connects a second subscriber of the bus arrangement to the first subscriber, and the at least one bus line, which connects the coordinator to the first and the second subscribers,
wherein the first subscriber is configured to activate the second subscriber in the configuration phase via the second signal line,
wherein the coordinator is configured to transmit a message, which contains a second subscriber address, to the first subscriber and the second subscriber via the at least one bus line, and
wherein the second subscriber is configured to store the second subscriber address in a second volatile memory of the second subscriber.

9. A method for operating a bus arrangement, the method comprising:
receiving, by a first subscriber, an information message sent by a coordinator;
extracting a coordinator address of the coordinator from the information message in a configuration phase; and
establishing and storing a safety address, by the first subscriber, as a function of a first subscriber address of the first subscriber and the coordinator address in the configuration phase,
wherein a bus couples the coordinator to the first subscriber, and
wherein the method further comprises the first subscriber determining the safety address in that:
the first subscriber multiplies the coordinator address by a prespecified value M to determine a first product, and adds the first subscriber address to the first product, or
the first subscriber multiplies the first subscriber address by a prespecified value N to determine a second product, and adds the coordinator address to the second product.

* * * * *